United States Patent [19]
Yoshihara et al.

[11] Patent Number: 5,993,290
[45] Date of Patent: Nov. 30, 1999

[54] MAGNETIC HEAD GRINDING METHOD AND APPARATUS

[75] Inventors: Shinya Yoshihara; Hiroshi Shindou, both of Akita; Yoshiaki Ito; Masao Yamaguchi, both of Nagano, all of Japan

[73] Assignee: TDK Corporation, Tokyo, Japan

[21] Appl. No.: 09/019,804

[22] Filed: Feb. 6, 1998

[30] Foreign Application Priority Data

Jun. 21, 1997 [JP] Japan ..................................... 9-180475

[51] Int. Cl.⁶ ....................................................... B24B 1/00
[52] U.S. Cl. ........................ 451/28; 29/603.17; 29/603.16
[58] Field of Search ............................ 29/603.17, 603.16

[56] References Cited

U.S. PATENT DOCUMENTS

| | | |
|---|---|---|
| 4,689,877 | 9/1987 | Church . |
| 4,914,868 | 4/1990 | Curch et al. ................................. 451/5 |
| 5,065,483 | 11/1991 | Zammit . |
| 5,210,667 | 5/1993 | Zammit .................................. 360/113 |
| 5,620,356 | 4/1997 | Lackey et al. ................................ 451/5 |

FOREIGN PATENT DOCUMENTS

| | | |
|---|---|---|
| 55-150120 | 11/1980 | Japan . |
| 58-115618 | 7/1983 | Japan . |
| 60-76011 | 4/1985 | Japan . |
| 2-95572 | 4/1990 | Japan . |

*Primary Examiner*—David A. Scherbel
*Assistant Examiner*—Shantese McDonald
*Attorney, Agent, or Firm*—Oblon, Spivak, McClelland, Maier & Neustadt, P.C.

[57] ABSTRACT

In the case where an object to be ground is ground by mounting a horizontally elongated jig onto a grinding head and by bringing the object into contact with a grinding surface of a grinding disk being driven and rotated, the attitude of the grinding head is controlled by an adjust ring that is in surface contact with the grinding surface of the grinding disk while moving the grinding head, the horizontally elongated jig holding thereon the object that has a plurality of thin film magnetic heads arrayed thereon. Thereby, the flatness of the object is improved and variations in the throat heights of many magnetic heads formed on the object to be ground are reduced by allowing the attitude of the object to be controlled with a grinding surface of a grinding disk as a reference.

14 Claims, 11 Drawing Sheets

MAGNETIC HEAD GRINDING METHOD AND APPARATUS

BACKGROUND OF THE INVENTION

1. Field of the Invention

The invention relates to a magnetic head grinding method and an apparatus for grinding an object that has a plurality of magnetic heads arrayed thereon.

2. Description of Related Art

In a conventional batch type process for manufacturing thin film magnetic heads for use in disk drive devices of computers, an object to be ground has many converting portions including magnetic thin film arranged in a single array on a ceramic bar that will become sliders while cut into pieces, so that the throat heights of the gaps of the converting portions can be set to values optimized for reading and writing data signals.

In the case where the throat heights of magnetic heads are set to appropriate values during the grinding process, there is a problem that a ceramic bar, which is an object to be ground, is distorted and has therefore undesirable bends. That is, if the ceramic bar has distortions and bends, the ceramic bar cannot be ground uniformly by the grinding disk of the grinding apparatus. Therefore, there is a likelihood that the throat heights of thin film magnetic heads on both end portions of the ceramic bar will be so large or so small that the magnetic heads on both end portions become defective even though the throat heights of, e.g., thin film magnetic heads in the middle of the ceramic bar are proper.

To overcome this problem, a magnetic head grinding apparatus disclosed in U.S. Pat. No. 5,620,356 is designed so that a ceramic bar is ground by correcting bends thereof while measuring resistances that are varied in accordance with the throat heights of a plurality of thin film magnetic heads arrayed on the ceramic bar. As a result, the throat heights of the respective thin film magnetic heads formed on the ceramic bar can be set to proper values.

By the way, the conventional grinding apparatus such as proposed by U.S. Pat. No. 5,620,356 is constructed so that an object to be ground having many converting portions including magnetic thin film arranged in a single array on a ceramic bar is attached to the bottom surface of a platelike, horizontally elongated jig and that such horizontally elongated jig is further mounted onto a back plate disposed on the apparatus side. However, such conventional grinding apparatus imposes a problem that the attitude of the back plate having the horizontally elongated jig mounted thereon is not set with the grinding surface of the grinding disk as a reference. For example, in the case where the back plate is initially set vertical assuming that the grinding surface of the grinding disk is horizontal, the fact that the grinding surface is out of horizontality affects the accuracy with which to grind the object (the flatness of the grinding surface is reduced, and variations in throat height are increased, etc.).

SUMMARY OF THE INVENTION

The invention has been made in view of the aforementioned circumstances. An object of the invention is, therefore, to provide a magnetic head grinding method and a magnetic head grinding apparatus that allows an operator to control the attitude of an object to be ground while referring to the grinding surface of the grinding disk, so that the flatness of the object to be ground can be improved and hence variations in the throat heights of many magnetic heads formed on the object can be reduced.

To achieve the above objects, according to a magnetic head grinding method of the invention, a jig holding thereon an object to be ground, which has a plurality of magnetic heads arrayed thereon, is mounted onto a grinding head; and the object is ground while bringing the object into contact with a grinding surface of a grinding disk being rotary driven while moving the grinding head, the attitude of the grinding head is controlled using an adjust ring that is in surface contact with the grinding surface of the grinding disk.

In the magnetic head grinding method, the grinding head may be caused to rotate continuously or to swing repetitively within a predetermined angle.

Further, the object to be ground may be ground while rotating the adjust ring.

Still further, the object may be ground while reciprocating the grinding head and the adjust ring linearly.

A magnetic head grinding method of the second aspect of the invention comprises the steps of: mounting a jig holding thereon an object to be ground onto a back plate, the object having a plurality of magnetic heads arrayed thereon, using a grinding head, a tilting section, and the back plate, the grinding head having an attitude thereof controlled by an adjust ring that is in surface contact with a grinding surface of a grinding disk being driven and rotated, the tilting section being tiltable around a tilting shaft extending in parallel with the grinding surface with respect to the grinding head, the back plate being rotatably attached to a lower portion of a vertically moving section that is vertically movable with respect to the tilting section;

carrying out a first grinding process for grinding the plurality of magnetic heads attached to the object uniformly by supporting the jig by a vertical surface with respect to the grinding surface, by applying pressing forces to both sides of a point at which the back plate is rotatably attached with balancing actuators, respectively, and by applying operating forces to both end portions and a middle portion of the jig with correcting actuators; and carrying out a second grinding process for tapering a bottom surface of the object by supporting the jig so as to be tilted from the vertical surface with respect to the grinding surface while inclining the tilting section with respect to the grinding head, the aforementioned steps being carried out sequentially.

In the second magnetic head grinding method, it is suggested that an amount ground in the second grinding process be detected by detecting positions of left and right end portions of the jig using sensors.

A magnetic head grinding apparatus of the invention includes: a grinding disk that is to be driven and rotated; an adjust ring that is supported so as to be in surface contact with a grinding surface of the grinding disk; a grinding head whose attitude is controlled by the adjust ring; a tilting section that is tiltable with respect to the grinding head around a tilting shaft extending in parallel with the grinding surface; inclining means that inclines the tilting section; a back plate being rotatably attached to a lower portion of a vertically moving section that is vertically movable with respect to the tilting section; balancing actuators that apply pressing forces to both sides of a point at which the back plate is rotatably attached, respectively; a jig that is mounted onto the back plate for holding an object to be ground thereon, the object having a plurality of magnetic heads arrayed thereon; and correcting actuators that apply operating forces to both end portions and a middle portion of the jig.

In the magnetic head grinding apparatus, the grinding head and the adjust ring may be rotatably supported with respect to a grinding head mounting frame that is movable within a plane parallel with the grinding surface of the grinding disk and may be caused to make swing motions within a predetermined angle by swing means disposed on the grinding head mounting frame.

The jig may be mounted onto the back plate at a single point in a middle portion thereof by mounting means.

Further, sensors for detecting locations of left and right end portions of the jig may be arranged.

DETAILED DESCRIPTION OF PREFERRED EMBODIMENTS

Magnetic head grinding methods and a magnetic head grinding apparatus according to an embodiment of the invention will be described with reference to the drawings.

Figure 1:
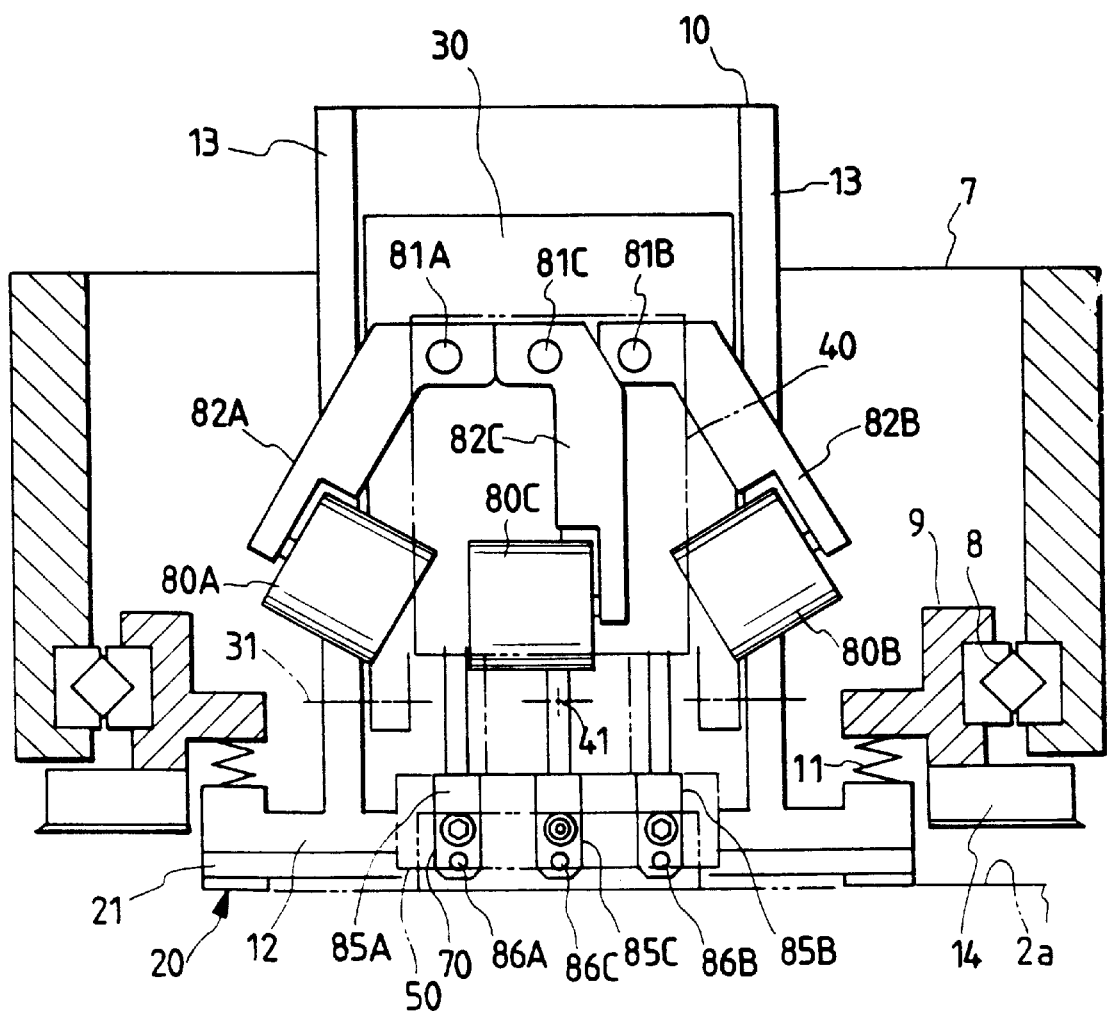
FIG. 1 is a front sectional view showing the general construction of a main portion of a magnetic head grinding method and apparatus, which is an embodiment of the invention.
Figure 2:
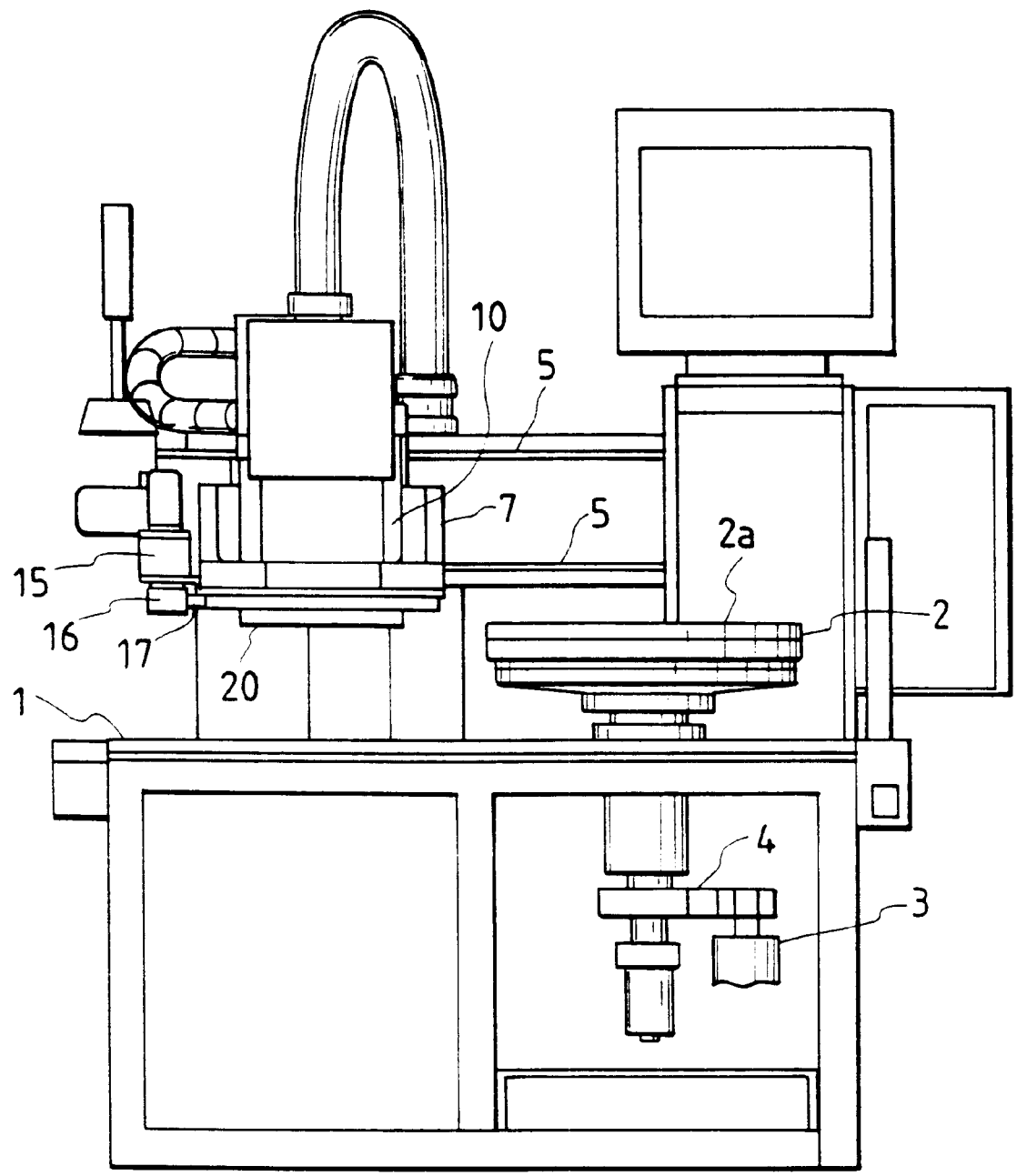
FIG. 2 is a front view showing an overall construction of the embodiment of the invention.
Figure 3:
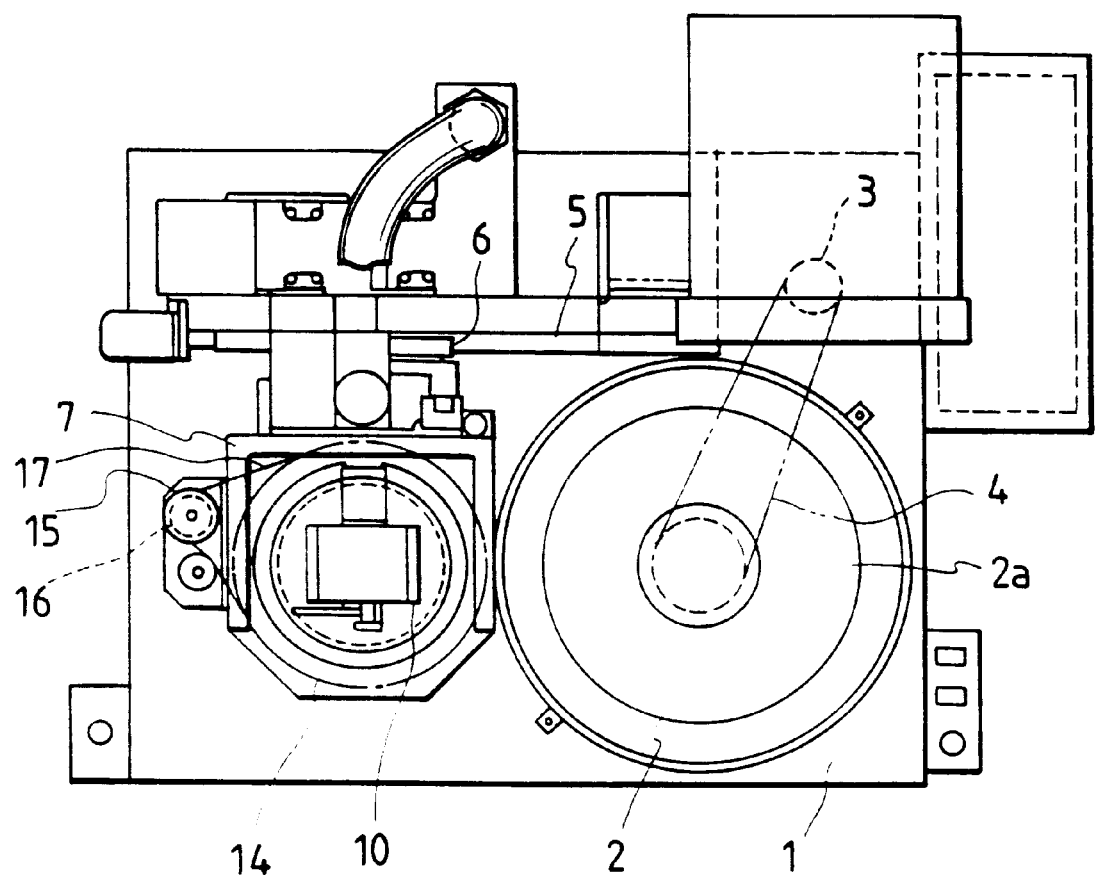
FIG. 3 is a plan view showing the same.

FIG. 1 outlines the construction of a main portion of an embodiment of the invention; FIGS. 2 and 3 show details of the construction of the entire part thereof; and FIGS. 4 to 7 show details of the construction of a main portion thereof.

First, the construction of the entire part of the embodiment will be described with reference to FIGS. 2 and 3. In FIGS. 2 and 3, a base table 1 supports a grinding disk 2 so as to be rotatable within a horizontal plane. The grinding disk 2 is driven and rotated by a plate drive motor 3 through a belt 4, the surface plate drive motor 3 serving as a rotation drive source within the base plate 1.

Above the base table 1, there is a pair of guide rails 5. The pair of guide rails 5 is supported horizontally on the base table side. A horizontally moving slider 6 shown in FIG. 3 is slidably guided by the pair of guide rails 5. A grinding head mounting frame 7 is mounted on the horizontally moving slider 6 so as to be vertically movable (the grinding head mounting frame 7 is driven to move up and down so as to adjust the height freely). The horizontally moving slider 6 is driven by, e.g., screwing a ball bearing leadscrew extending in parallel with the guide rails 5 into a nut on the slider side and by driving to rotate the ball bearing leadscrew with a motor. The slider 6 and the grinding head mounting frame 7 make linear motions to reciprocate.

Figure 10:
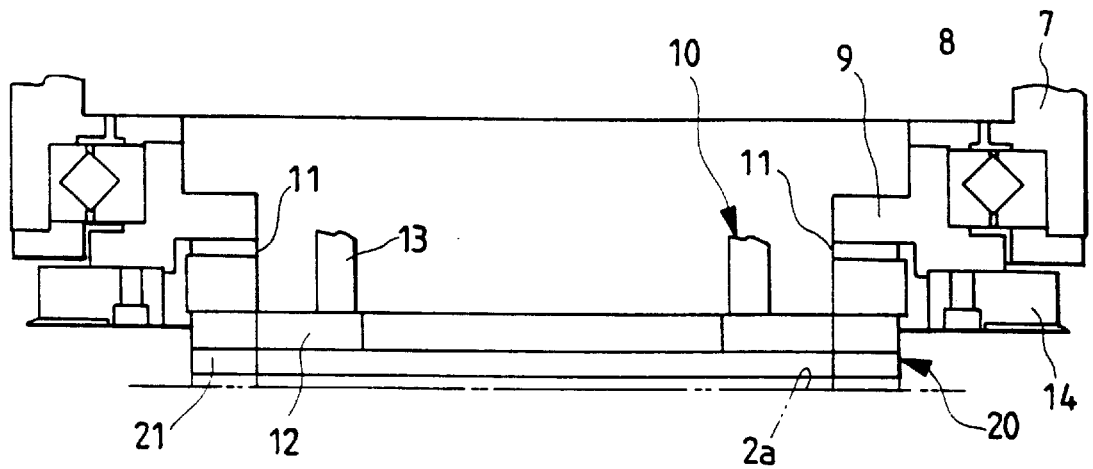
FIG. 10 is a front sectional view showing a portion in which a grinding head and an adjust ring are mounted onto a grinding head mounting frame in the embodiment.

As shown in FIGS. 1 and 10, a rotation support section 9 is rotatably supported inside the grinding head mounting frame 7 through an annular bearing portion 8, and a grinding head 10 is mounted on the rotation support section 9 through an elastic member 11 such as a flat spring or rubber. The grinding head 10 has a bottom plate 12 and vertical support plates 13 that are erected and fixed on the bottom plate 12 and extend in parallel with each other. An adjust ring (wear pad) 20 is secured to the bottom surface of the bottom plate 12. The adjust ring 20 comes in surface contact with a grinding surface 2a that is the upper surface of the grinding disk. A belt pulley 14 is secured to the rotation support section 9, and as shown in FIGS. 2 and 3, a grinding head swing motor 15 for driving to rotate a belt pulley 16 is mounted outside the grinding head mounting frame 7. A belt 17 is installed between the belt pulleys 14, 16. The swing motor 15, the belt pulleys 14, 16, and the belt 17 function as swing means for causing the grinding head 10 and the adjust ring 20 to make swing motions within a predetermined angle.

Figure 11:
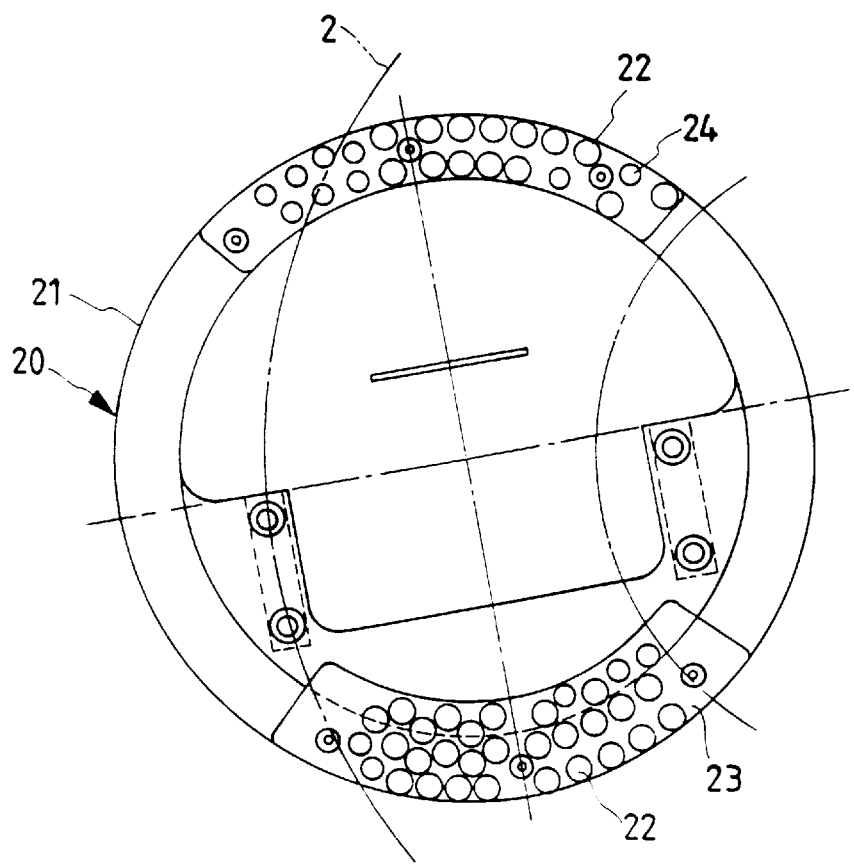
FIG. 11 is a bottom view of the adjust ring used in the embodiment.

FIG. 11 is a bottom view of the adjust ring 20. The adjust ring 20 is formed by a ring body 21 made of aluminum to which arcuate portions 23 and 24 are attached. Many cylindrical dummies 22 that are made of wear resistant ceramic are embedded into the arcuate portions 23 and 24, and the lower end faces of the cylindrical dummies 22 are slightly projected from the arcuate portions 23 and 24. Here, the number of cylindrical dummies 22 is set so as to be balanced against the weight of the grinding head to be mounted on the adjust ring 20. In FIG. 11, since the arcuate portion 23 that comes in surface contact with the grinding disk 2 receives a larger amount of load from the grinding head, the number of cylindrical dummies 22 on the arcuate portion 23 is made larger than those on the arcuate portion 24.

Figure 4:
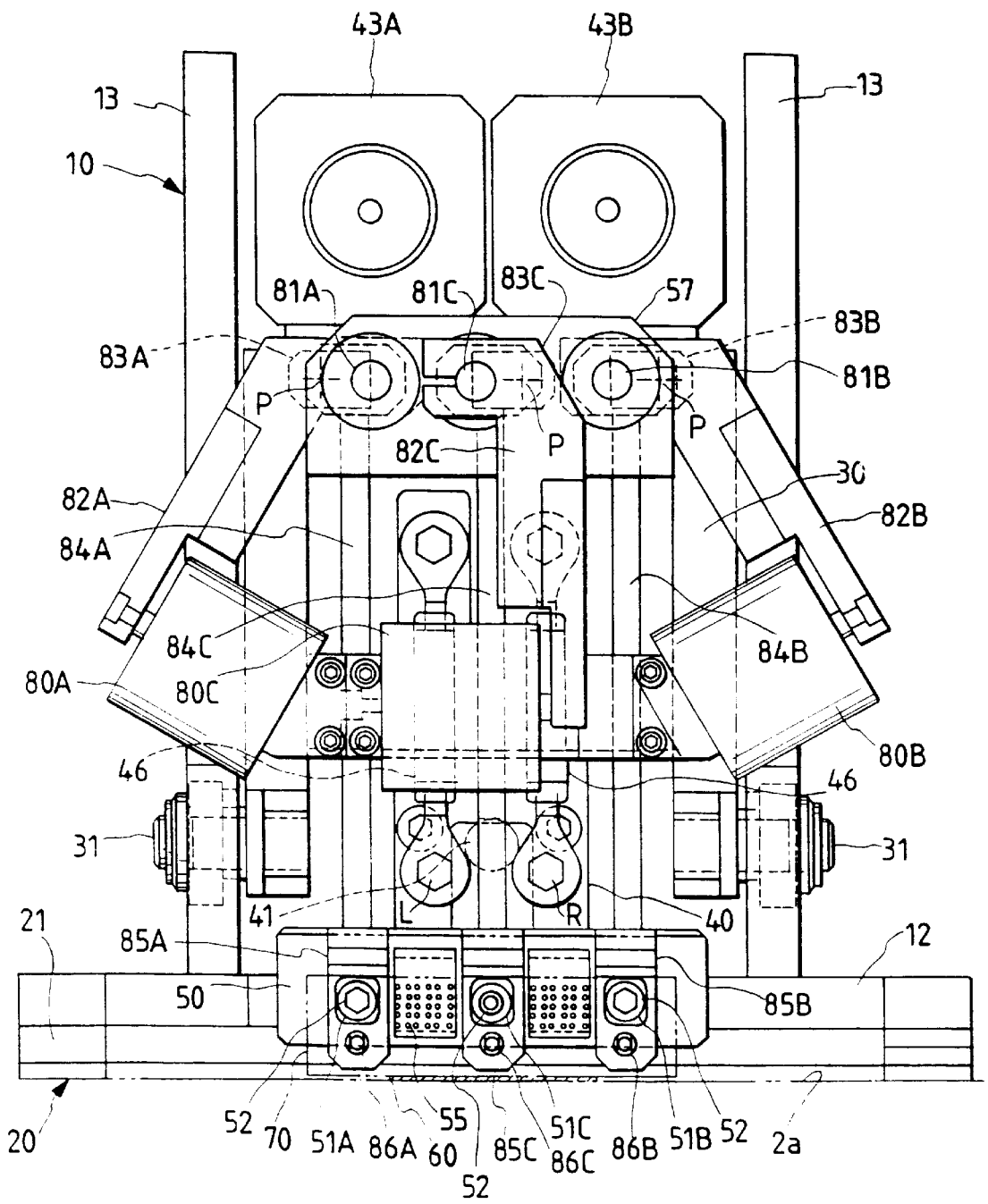
FIG. 4 is a front view showing the construction of a main portion of the embodiment.
Figure 5:
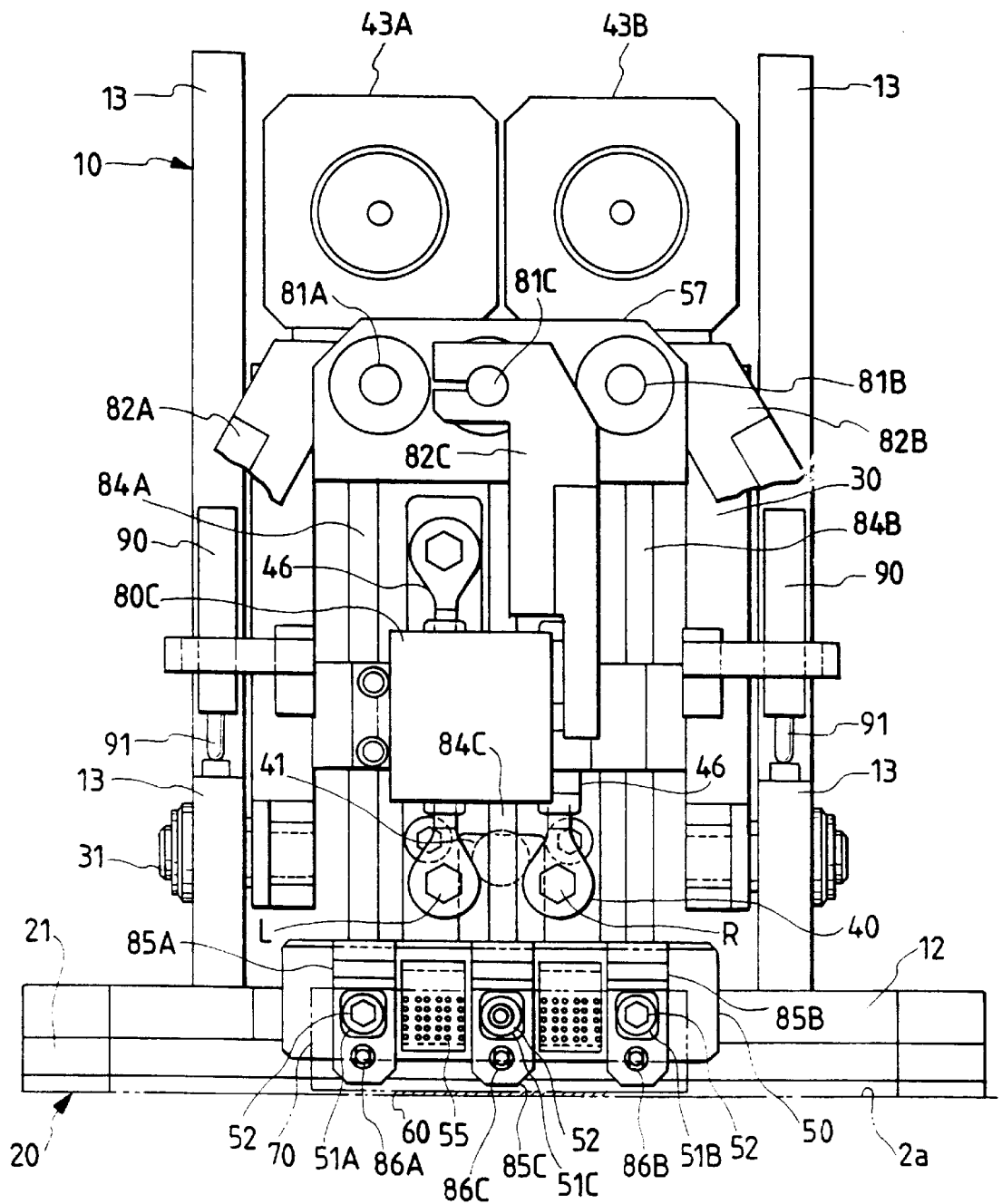
FIG. 5 is a partially omitted front view showing the construction of a main portion of the embodiment including sensors for detecting the locations of both left and right ends of a horizontally elongated jig.
Figure 6:
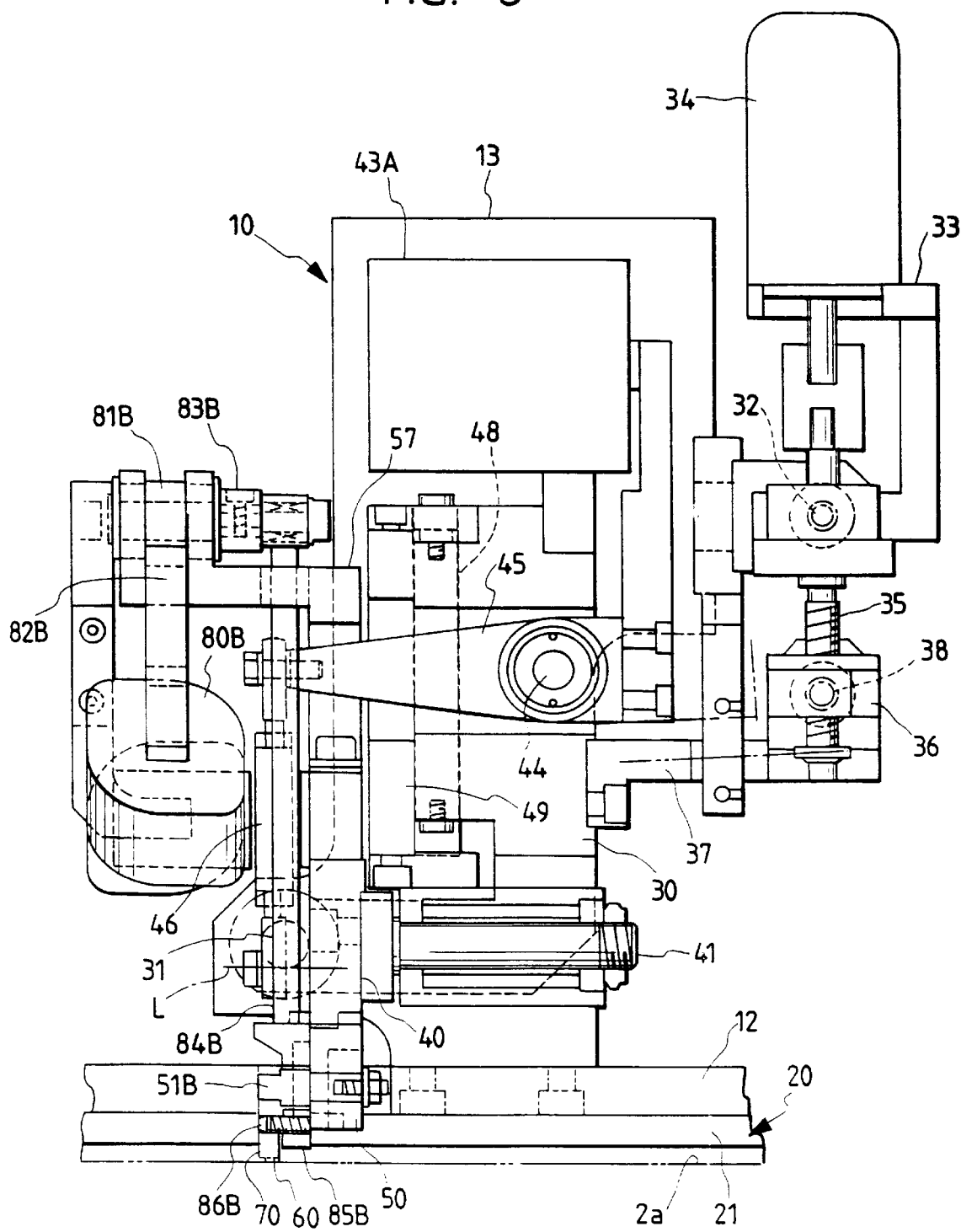
FIG. 6 is a side sectional view showing the construction of a main portion of the embodiment.
Figure 7:
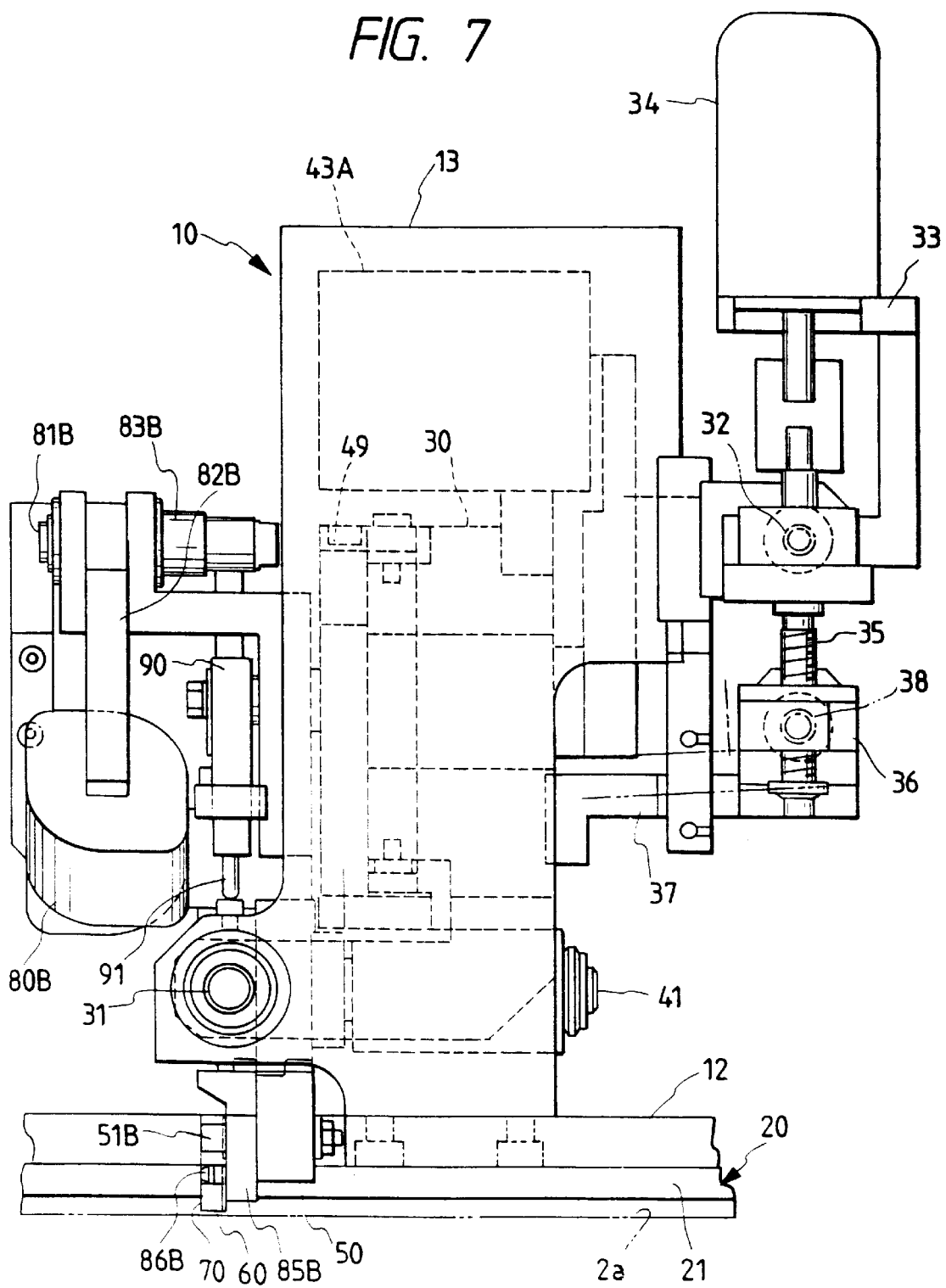
FIG. 7 is a side view showing the construction of a main portion of the embodiment.

As shown in FIGS. 4 to 7, a tilting section 30 is mounted onto the grinding head 10 between the vertical support plates 13 of the grinding head 10 by a tilting shaft 31 so as to be tiltable around the tilting shaft 31. The tilting shaft 31 extends in parallel with the lower surface of the adjust ring 20 (i.e., the grinding surface 2a of the grinding disk). As shown in FIGS. 6 and 7, the lower portion of a motor mounting base section 33 is rotatably mounted on the side of the vertical support plate 13 of the grinding head 10 by a fulcrum shaft 32, and a tilting motor 34 is fixed onto the upper portion of such motor mounting base section 33. A ball bearing leadscrew 35 is coupled to the rotation drive shaft of the tilting motor 34, and a nut 36 is screwed into the ball bearing leadscrew 35. An arm 37 fixed to the tilting section 30 is coupled to the nut 36 by a fulcrum shaft 38. A mechanism including the elements from the fulcrum shaft 32 to the fulcrum shaft 38 constitutes an inclining means that inclines the tilting section 30 by a predetermined angle from the condition in which the tilting section 30 stands upright with respect to the grinding surface 2a of the grinding disk.

A vertically moving section 49 is mounted onto the tilting section 30 through a slide bearing (cross roller guide) 48 so as to be vertically movable along the tilting section 30. However, the vertically moving section 49 is inclined integrally with the tilting section 30, so that the tilting section 30 and the vertically moving section 49 keep in parallel with each other. A back plate 40 is rotatably mounted onto the lower end portion of the vertically moving section 49 by a fulcrum shaft 41. The fulcrum shaft 41 extends in parallel with the grinding surface 2a of the grinding disk and orthogonally to the tilting shaft 31. Balancing actuators 43A, 43B are mounted onto the upper portion of the tilting section 30 as shown in FIGS. 4 and 5. The balancing actuators 43A, 43B serve to press (apply pressure) downward both left and right sides of the fulcrum shaft 41 of the back plate 40. As shown in FIG. 6, the drive shafts of the balancing actuators 43A, 43B are coupled to ends of bell cranks (levers) 45 that are journaled to the tilting section 30 at fulcrum shafts 44. Coupling links 46 couple the other ends of the bell cranks 45 and the left and right sides of the back plate 40. It is L, R that are the points at which the left and right coupling links 46 are rotatably mounted onto the back plate 40. It may be noted that, if the tare of the vertically movable portions including the vertically moving section 49, the back plate 40, a horizontally elongated jig 70, and the like is sufficiently large, then the pressing forces of the balancing actuators 43A, 43B may, in some cases, be set to negative values (raising forces).

Figure 8:
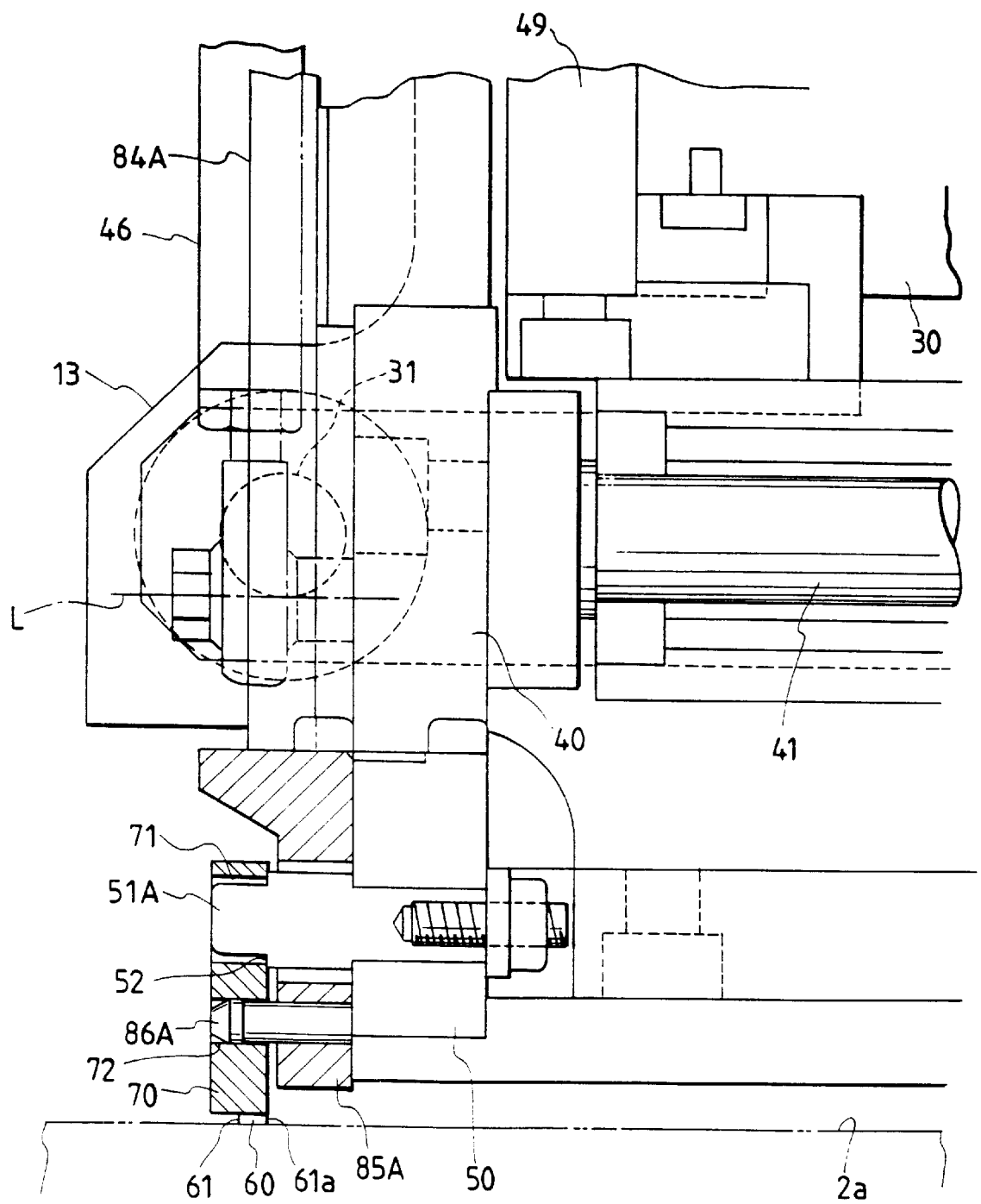
FIG. 8 is an enlarged side sectional view showing a main portion, which is a horizontally elongated jig mounting portion in the embodiment, with the cross section of a left end side of the horizontally elongated jig enlarged.
Figure 9:
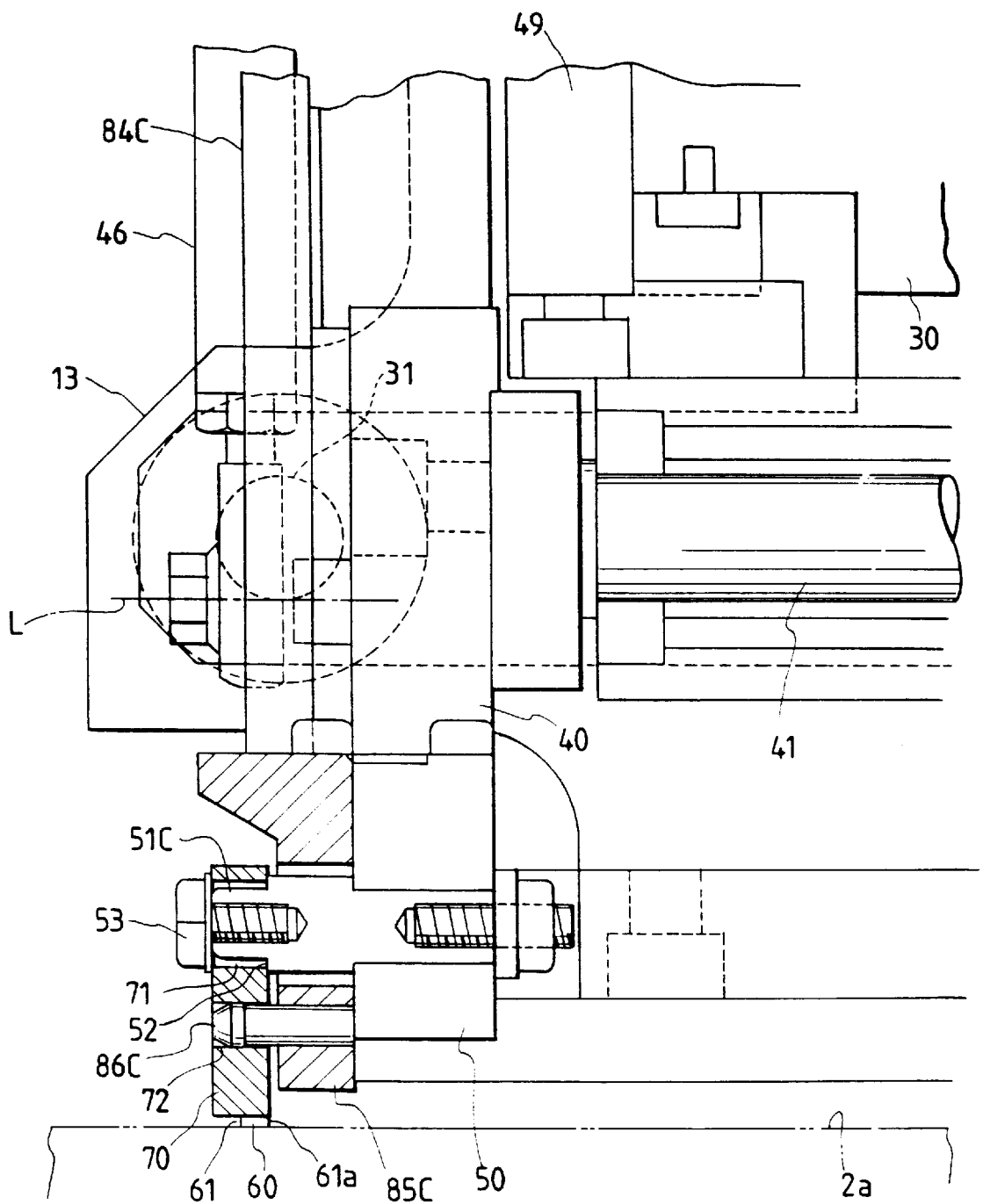
FIG. 9 is an enlarged side sectional view showing a main portion with the cross section of a middle portion of the horizontally elongated jig enlarged.

Stepped columnlike projected portions 51A, 51B, 51C are arranged integrally on both left and right end portions and in the middle portion of a rectangular platelike portion 50 as shown in FIGS. 4 and 5 in order to mount the rectangular platelike horizontally elongated jig 70 onto the front surface of the rectangular platelike portion 50, the rectangular platelike portion 50 constituting the lower portion of the back plate 40, and the horizontally elongated jig 70 having the object 60 bonded to the bottom surface thereof as shown in FIGS. 8 and 9. Each of the stepped columnlike projected portions 51A, 51B, 51C has, as shown in FIGS. 8 and 9, a stepped surface 52 in the middle thereof, forming the front end side thereof from such stepped surface 52 into a small diameter portion (slender diameter portion). The horizontally elongated jig 70 has through holes 71 corresponding to (engageable with) the small diameter portions on the front ends of the stepped columnlike projected portions 51A, 51C, and the back surface of the horizontally elongated jig 70 is supported so as to be in contact with the stepped surfaces 52 of the respective stepped columnlike projected portions 51A, 51B, 51C. It may be noted that it is only the front end face of the stepped columnlike projected portion 51C in the middle that is screwed by a mounting machine screw 53 as shown in FIG. 9; that is, the rectangular platelike horizontally elongated jig 70 is unreleasably held at a single point. Here, the mounting through holes 71 of the horizontally elongated jig 70 are formed so as to be slightly larger than the small diameter portions on the front ends of the respective stepped columnlike projected portions 51A, 51B, 51C, so that the horizontally elongated jig 70 can be held with such a play as to allow the jig to be vertically movable with respect to the rectangular platelike section 50 of the back plate 40 to some degree.

The object 60 that is attached (bonded with an adhesive) to the bottom surface of the horizontally elongated jig 70 is formed by arranging many converting portions of magnetic heads in a single array on a slender square ceramic bar, each converting portion being formed of a magnetic thin film pattern. The ceramic bar provides the sliders of the thin film magnetic heads while separated into pieces. The magnetic thin film patterns of the converting portions are arrayed on one longitudinally extending side surface 61a of the ceramic bar 61. Therefore, by grinding the bottom surface side of the ceramic bar 61, the throat heights of the converting portions located at the longitudinally extending side surface 61a can be changed (reduced).

As shown in FIGS. 1 and 4, correcting actuators 80A, 80B, 80C are mounted on the side of the back plate 40 in order to correct distortions or bends of the object 60 attached to the bottom surface of the horizontally elongated jig 70. The correcting actuator 80A adds operating force to the left end portion of the horizontally elongated jig 70, and is designed to rotate an arm 82A secured to a rotary shaft 81A that is rotatably supported on the upper portion of an upper extended portion 57 integrated with the back plate 40. A driven arm 83A is secured to the rotary shaft 81A. The upper end portion of a vertically moving rod 84A is coupled to the driven arm 83A at a rotatably attached point P. A correcting vertically moving member 85A is secured to the lower end of the vertically moving rod 84A. As shown in FIG. 8, the correcting vertically moving member 85A is vertically slidable along a gap between the rectangular platelike portion 50 of the back plate 40 and the horizontally elongated jig 70 that is mounted onto the rectangular platelike portion 50. A correcting pin 86A that perfectly engages with a correcting hole 72 is fixed to the correcting vertically moving member 85A. The correcting hole 72 is located at the left end portion of the horizontally elongated jig 70. Therefore, in FIG. 4, by rotating the arm 82A and by driving the correcting vertically moving member 85A having the correcting pin 86A to move finely in vertical directions through the driven arm 83A and the vertically moving rod 84A, the height of the left end portion of the horizontally elongated jig 70 and hence the height of the left end portion of the object 60 fixed to the horizontally elongated jig 70 can be finely changed.

The correcting actuator 80B adds operating force to the right end portion of the horizontally elongated jig 70. The mechanism required therefor is similar to that of the correcting actuator 80A. That is, by rotating an arm 82B secured to a rotary shaft 81B that is rotatably supported by the upper extended portion 57, a correcting vertically moving member 85B having a correcting pin 86B is driven to move finely in vertical directions through a driven arm 83B and a vertically moving rod 84B.

The correcting actuator 80C adds operating force to the middle portion of the horizontally elongated jig 70. The mechanism required therefor is similar to that of the correcting actuator 80A. That is, by rotating an arm 82C secured to a rotary shaft 81C that is rotatably supported by the upper extended portion 57, a correcting vertically moving member 85C having a correcting pin 86C in the middle is driven to move finely in vertical directions through a driven arm 83C and a vertically moving rod 84C as shown in FIG. 4.

By adding the operating forces of the correcting actuators 80A, 80B, 80C to the left and right end portions and to the middle portion of the horizontally elongated jig 70, distortions and bends of the object 60 attached to the bottom surface of the horizontally elongated jig 70 can be corrected.

It may be noted that grinding operation is performed while measuring electric resistances corresponding to the throat heights of, e.g., the converting portions located on the left and right end portions and the converting portions located in the middle portion of the ceramic bar 61 in FIGS. 8 and 9 at a predetermined cycle in order to optimally set the throat heights of the respective converting portions of the magnetic heads made of magnetic thin film arrayed along one longitudinally extending side surface 61a of the square ceramic bar 61 that will become the object 60. Although not described in detail, electrodes electrically connected to the converting portions are formed on a horizontally elongated jig surface confronting the rectangular platelike portion 50 on the side of the back plate 40, and the electrodes are connected to measuring pins 55 formed on the rectangular platelike portion 50 in FIGS. 4 and 5. The measuring pins 55 are connected to unillustrated electric resistance measuring means.

As shown in FIGS. 5 and 7, contact sensors 90 are fixed to the left side edge and the right side edge of the upper extended portion 57 that is integrated on the back plate 40 through fasteners. The contact sensors 90 are provided to detect the locations of the left and right end portions of the horizontally elongated jig 70 that is mounted onto the rectangular platelike portion 50 of the back plate 40 (the locations of the left and right side edges of the upper extended portion 57 substantially correspond to the locations of the left and right end portions of the horizontally elongated jig 70). The tip of a contact 91 of each contact sensor 90 is in contact with the projected upper surface formed on the corresponding vertical support plate 13 of the grinding head 10. The contact sensor 90 produces a capacitance change proportional to the amount projected from the contact 91. Sensors operating in accordance with other detecting principles can also be used. It may be noted that the reason why two contact sensors 90 are employed to detect the heights of the left and right side edges of the upper extended portion 57 (the locations of the left and right end portions of the horizontally elongated jig 70 are indirectly detected, respectively) is to detect the amount ground and the balance on both left and right sides.

The general operation of this embodiment will be described next.

The horizontally elongated jig 70 holding the object 60 on which a plurality of thin film magnetic heads are arrayed, as shown in FIGS. 8 and 9, is mounted onto the rectangular platelike portion 50 of the back plate 40 with the grinding head 10 being out of place from the grinding disk 2, as shown in FIGS. 2 and 3. The angle of inclination of the back plate 40 in FIG. 4 with respect to the grinding head 10 is initially set to zero (vertical with respect to the bottom surface of the adjust ring 20; i.e., in a vertical position with respect to the grinding surface 2a of the grinding disk).

When the angle of inclination of the back plate 40 has been set and the horizontally elongated jig 70 has been mounted, the grinding head mounting frame 7 in FIG. 2 with the grinding head 10 mounted thereon is caused to move linearly along the guide rails 5 to thereby locate the grinding head mounting frame 7 above the grinding disk 2 that is being driven and rotated. Then, the grinding head mounting frame 7 is lowered so that the adjust ring 20 comes in surface contact with the grinding surface 2a of the upper surface of the grinding disk 2 with an appropriate pressing force. With the adjust ring 20 coming in surface contact with the grinding surface 2a of the grinding disk 2 with an appropriate pressing force, the attitude of the grinding head 10 on the adjust ring 20 is controlled with the grinding surface as a reference. The tilting section 30 in FIG. 4 set vertically on the bottom surface of the adjust ring 20, the rectangular platelike portion 50 of the back plate 40, and the horizontally elongated jig 70 mounted onto the rectangular platelike portion 50, form a vertical surface with respect to the grinding surface 21. Under this condition, not only the pressing forces are applied to both sides of the fulcrum shaft 41 serving as a rotatably attached point of the rectangular platelike portion 50 on the side of the back plate 40 with the balancing actuators 43A, 43B, but also the vertical operating forces are applied to both end portions and the middle portion of the horizontally elongated jig 70 with the correcting actuators 80A, 80B, 80C, so that a first grinding process is carried out in order to set optimally the throat heights of the converting portions of the respective thin film magnetic heads (formed as shown in FIGS. 8 and 9 on the longitudinally extending side surface 61a of the ceramic bar 61) in the object 60. If, e.g., as seen in FIG. 4, the object 60 is bent downward so as to form a projected surface, not only the correcting actuators 80A, 80B for operating on the left and right ends are operated to press the left and right end portions of the horizontally elongated jig 70 downward, but also the operation of the correcting actuator 80C for operating on the middle portion is either stopped or slowed down, so that the lower portion of the object 60 can be made flat. Further, the balancing actuators 43A, 43B adjust pressing forces applied to both left and right sides of the object 60 so as to not only make uniform the amounts ground on both left and right sides of the object 60, but also forward the object 60 toward the grinding surface 2a.

If the adjust ring 20 is in contact with the grinding disk at the same point during the first grinding process, one-sided wear is caused. To overcome this problem, as shown in FIG. 10, not only the rotation support section 9 having the grinding head 10 and the adjust ring 20 mounted thereon is rotated in both ways within a predetermined angle by the grinding head oscillating motor 15 of FIG. 2, but also the grinding head mounting frame 7 is caused to move linearly back and forth within a predetermined range. Therefore, during the first grinding process, the grinding head 10 and the adjust ring 20 make motions in which rotary motions in both directions overlap with linear motions in both directions.

The converting portions of the magnetic-thin-film-made magnetic heads are arrayed on the longitudinally extending side surface 61a of the square ceramic bar 61 as shown in FIGS. 8 and 9. The throat height of each converting portion can be detected by measuring the electric resistance of the corresponding converting portion. By carrying out the first grinding process while monitoring the electric resistance of each converting portion cyclically, the throat heights of the respective thin film magnetic heads can be made uniform and set optimally.

Figure 12:
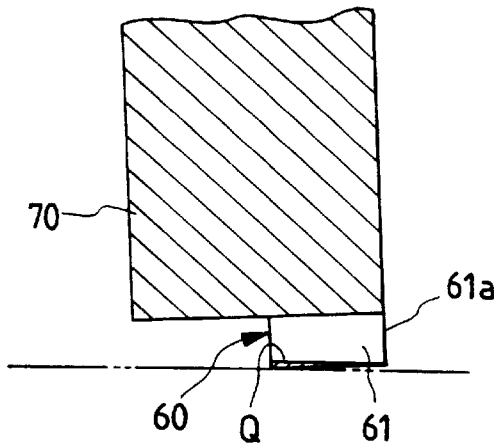
FIG. 12 is a side sectional view of an object to be ground for illustrating the operation of tapering the object in the embodiment.

After the first grinding process for making uniform and setting optimally the throat heights of the respective thin film magnetic heads, a second grinding process shown in FIG. 12 has a bottom surface of the square ceramic bar 61, which is the object 60, inclined at a maximum of about 3° with respect to a horizontal plane and is carried out (the second grinding process being intended to taper the bottom surface of the square ceramic bar 61 by removing a shaded portion Q). That is, as seen in FIG. 6, by operating the tilting motor 34, the tilting section 30 and the back plate 40 are inclined so as to form a predetermined angle, which is about 3° at maximum, from the condition in which these members 30, 40 have formed a vertical surface with respect to the grinding surface 2a of the grinding disk. In association therewith, the rectangular platelike portion 50 of the back plate 40 and the horizontally elongated jig 70 mounted onto the rectangular platelike portion 50 are inclined by the predetermined angle from the vertical surface with respect to the grinding surface 2a. . Under this condition, as shown in FIGS. 8 and 9, the bottom surface portion of the ceramic bar 61 is ground by the rotating grinding surface 2a. Further, when the amounts ground detected by the contact sensors 90 of FIG. 5 on the left and right sides performing the location detecting operations (indirect location detection on both left and right end portions of the horizontally elongated jig 70) on both left and right side edges of the upper extended portion 57 integrated with the back plate 40 have reached predetermined values, the grinding operation is terminated. It may be suggested that the grinding head 10 and the adjust ring 20 be caused to make overlapping motions similar to the first grinding process; i.e., these members 10 and 20 are caused to make motions in which rotary motions in both directions overlap with linear motions in both directions in the second grinding process.

The following advantages can be obtained by this embodiment.

(1) In the case where the horizontally elongated jig 70 holding thereon the object 60, which has a plurality of thin film magnetic heads arrayed thereon, is mounted on the grinding head 10 and the object 60 is ground so as to cause the object 60 to come in contact with the grinding surface 2a of the rotating grinding disk while moving the grinding head 10, the attitude of the grinding head 10 is controlled by the adjust ring 20 that is in surface contact with the grinding surface of the grinding disk. That is, the attitudes of the grinding head 10, and the tilting section 30 and the back plate 40 mounted onto the grinding head 10 can be controlled with the grinding surface 2a of the grinding disk as a reference. In addition, the object 60 can be ground while applying mechanical pressing forces (other than the tare) to the object 60. Further, by effecting a correct attitude control of the object 60, not only the flatness of the bottom surface of the object 60 can be improved, but also variations in the throat heights of the converting portions of the respective thin film magnetic heads formed on the longitudinally extending side surface 61a of the object 60 can be reduced as seen in FIGS. 8 and 9.

(2) By selecting the number of cylindrical dummies 22 of the adjust ring 20 in FIG. 11 in accordance with the load distribution of the grinding head, one-sided wear of the adjust ring 20 can be prevented, which in turn contributes to improving the flatness of the bottom surface of the object to be ground.

(3) The grinding head 10 and the adjust ring 20 in FIGS. 4 and 5 make motions in which rotary motions in both directions overlap with linear motions in both directions within a plane parallel to the grinding surface 2a of the grinding disk, which in turn contributes to not only preventing one-sided wear of the adjust ring 20 but also improving the flatness of the bottom surface of the object 60.

(4) The square ceramic bar 61 of FIGS. 8 and 9, which is the object 60, is attached to the rectangular platelike portion 50 of the back plate 40 at a single point in the middle thereof. Therefore, even if the square ceramic bar 61 has a twist in a rotating direction, the square ceramic bar 61 can be ground while held without correcting such twist. As a result, there are no defects caused by twists. If the square ceramic bar 61 is attached at two points on both left and right ends thereof, the square ceramic bar 61 is attached to the back plate 40 with any twist thereof forcibly corrected. As a result, when the square ceramic bar 61 is removed from the back plate 40 after the grinding process has been finished, the square ceramic bar 61 is twisted again. Hence, there is a likelihood that the square ceramic bar 61 will be defective.

(5) The back plate 40 is mounted onto the vertically moving section 49 at a location closer to the lower portion of the back plate 40 by the fulcrum shaft 41, the vertically moving section 49 being vertically movable with respect to the tilting section 30. Therefore, the locations of the rectangular platelike portion 50 on the lower portion of the back plate 40 and the horizontally elongated jig 70 to be mounted onto the rectangular platelike portion 50 can be stabilized.

(6) By indirectly detecting in FIG. 5 the locations of both left and right end portions of the horizontally elongated jig 70 mounted onto the back plate 40 with the two contact sensors 90, the amounts ground and the balance between the left and right sides during the second grinding process (the process for tapering the object 60) can be detected. Further, the detected results may be utilized so as to effect automatic stop control of the grinding operation and the like.

Figure 13:
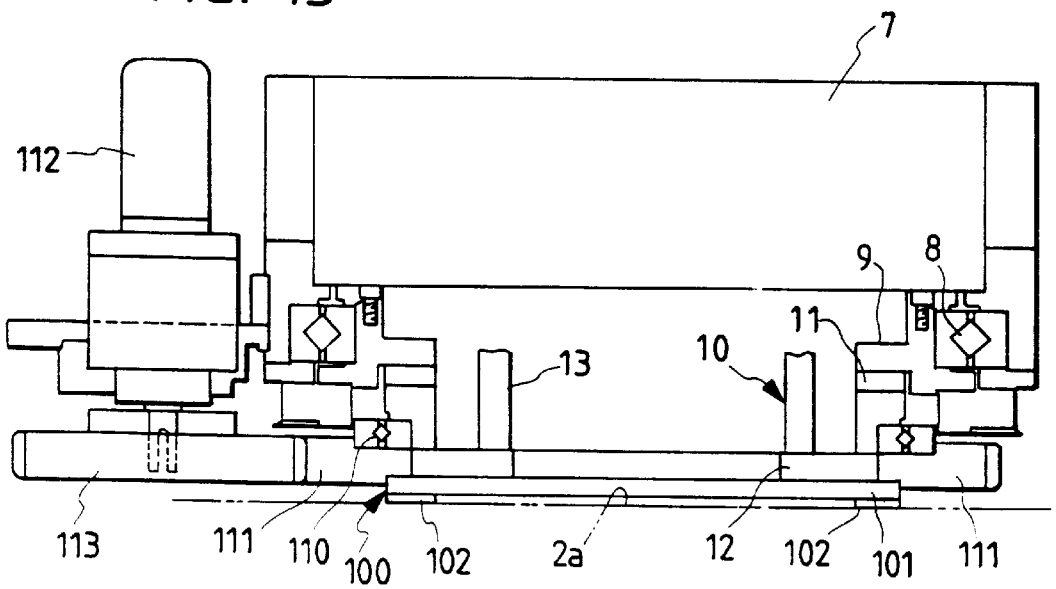
FIG. 13 is a front sectional view showing the construction of a main portion of another embodiment of the invention.
Figure 14:
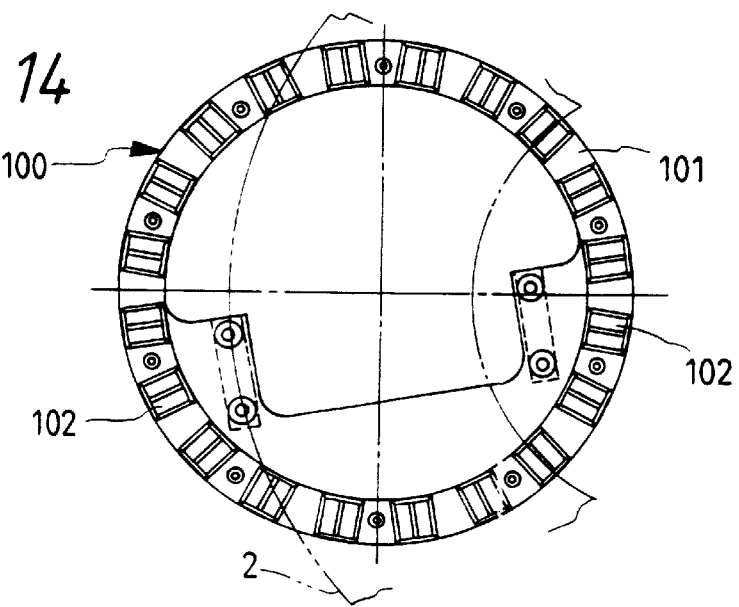
FIG. 14 is a bottom view of an adjust ring used in such another embodiment of the invention.

FIGS. 13 and 14 show another embodiment of the invention. FIGS. 13 and 14 show a construction for rotatably supporting an adjust ring 100 with respect to the grinding head 10 and for rotating the adjust ring 100 so as to prevent one-sided wear. In FIGS. 13 and 14, the rotation support section 9 is rotatably supported through the annular bearing portion 8 inside the grinding head mounting frame 7, and the grinding head 10 is mounted onto the rotation support section 9 through the elastic member 11 such as a flat spring or rubber. A large-diameter spur wheel 111 is rotatably mounted onto the outer circumference of the lower portion of the grinding head 10 through an annular bearing portion 110. It is to the spur wheel 111 that the adjust ring 100 is fixed. On the other hand, outside the grinding head mounting frame 7 is an adjust ring rotating motor 112. A spur wheel 113 secured to the rotating shaft of the motor 112 is meshed with the spur wheel 111 on the side of the adjust ring 100.

FIG. 14 is a bottom view of the adjust ring 100. For example, the adjust ring 100 is formed by embedding a great number of cylindrical dummies 102 that are made of wear resistant ceramic into a main body 101 that is made of aluminum. The bottom end faces of the cylindrical dummies 102 are slightly projected from the main body 101. Here, the dummies 102 are uniformly distributed over the adjust ring 100 since the adjust ring 100 rotates during grinding operation.

It may be noted that some gap that is allowed to be provided between the spur wheels 111, 113 when both wheels are meshed will not prevent the adjust ring 100 from coming in surface contact with the grinding surface 2a of the grinding disk 2. Further, since the grinding head 10 is mounted through the elastic member 11 such as a flat spring or rubber, the bottom plate 12 of the grinding head 10 is placed on the adjust ring 100 so as to be in intimate contact therewith. Therefore, the attitude of the grinding head 10 is set with the adjust ring 100 as a reference, and hence with the grinding surface 2a as a reference.

It may be noted that other constructional aspects of this embodiment are similar to those of the aforementioned embodiment.

In the embodiment shown in FIGS. 13 and 14, not only the grinding head 10 is caused to make rotary motions in both directions, but also the adjust ring 100 can be driven and rotated through the gear mechanism by the adjust ring rotating motor 112. Therefore, one-sided wear of the adjust ring 100 can be prevented, which in turn allows a grinding process not only free from variations but also providing satisfactory flatness to be implemented.

While electromagnetic actuators can be employed in FIG. 4 for the balancing actuators 43A, 43B and the correcting actuators 80A, 80B, 80C, actuators that are operated by other principles, such as hydraulic cylinders, may be employed as well.

Further, the rotational speed and direction of the grinding disk can be varied, and the temperature of the grinding surface 2a can be stabilized by temperature control.

Still further, while the case where the grinding head 10 is rotated in both directions within a predetermined angle has been described, the reason why the grinding 10 is rotated in both directions (swung) is to facilitate conduction to the motor disposed on the grinding head 10 (in order to prevent the wires from being cut due to twisting). Therefore, the grinding head 10 can be driven to continuously rotate in a single direction as long as motor conduction is modified by arranging conducting means such as slip rings.

The foregoing describes the embodiment of the invention. It is apparent to those skilled in the art that the invention is not limited to the aforementioned embodiment but that the invention may be modified and altered in various modes.

As described above, the invention is characterized as allowing the attitude of the grinding head 10 to be controlled by the adjust ring 20 that is in surface contact with the grinding surface 2a of the grinding disk using such grinding surface 2a as a reference. Therefore, the operation of grinding an object 60 can be performed by applying mechanical pressing forces (other than the tare) to the object 60 while effecting the attitude control of the object 60 with respect to the grinding surface 2a. Further, by carrying out the attitude control of the object 60 correctly, not only the flatness of the bottom surface of the object 60 can be improved, but also the variations in the throat heights of the converting portions of the respective magnetic heads can be reduced so that the throat heights can be set optimally.

What is claimed is:

1. A magnetic head grinding method comprising the steps of:

attaching to a grinding head a jig holding an object to be ground thereon, the object having a plurality of magnetic heads arrayed thereon;

controlling an attitude of the grinding head with an adjust ring being attached to a bottom surface thereof; and grinding the object while bringing the object into contact with a grinding surface of a grinding disk being driven and rotated by a drive motor.

2. A magnetic head grinding method according to claim 1, wherein the grinding head is caused to rotate continuously or to swing repetitively within a predetermined angle.

3. A magnetic head grinding method according to claim 2, wherein the adjust ring is caused to rotate continuously with the grinding head.

4. A magnetic head grinding method according to claim 2, wherein the grinding head and the adjust ring are caused to reciprocate linearly.

5. A magnetic head grinding method according to claim 1, wherein the adjust ring is caused to rotate continuously with the grinding head.

6. A magnetic head grinding method according to claim 1, wherein the grinding head and the adjust ring are caused to reciprocate linearly.

7. A magnetic head grinding method comprising the steps of:

mounting an object to be ground onto a jig held by a back plate, the object having a plurality of magnetic heads arrayed thereon;

carrying out a first grinding process for grinding the plurality of magnetic heads attached to the object to be ground uniformly by supporting the jig by a vertical surface with respect to a grinding surface, by applying pressing forces to both sides of a point at which the back plate is rotatably attached with balancing actuators, respectively, and by applying operating forces to both end portions and a middle portion of the jig with correcting actuators; and carrying out a second grinding process for tapering a bottom surface of the object to be ground by supporting the jig so as to be tilted from the vertical surface with respect to the grinding surface.

8. A magnetic head grinding method according to claim 7, wherein an amount ground in the second grinding process is detected by detecting positions of left and right end portions of the jig by using sensors.

9. A magnetic head grinding apparatus comprising:

a grinding disk having a grinding surface to be driven and rotated by a drive motor, a grinding head having a bottom plate to which an adjust ring is attached;

a tilting section being attached to and tiltable with respect to the grinding head around a tilting shaft extending in parallel with the grinding surface of the grinding disk;

inclining means, attached to the grinding head, for inclining the tilting section;

a back plate being rotatably attached to a lower portion of a vertically moving section of the grinding head and being vertically movable with respect to the tilting section;

balancing actuators, carried by the grinding head, for applying pressing forces to both sides of a point at which the back plate is rotatably attached, respectively;

a jig being attached to the back plate for holding an object to be ground, the object having a plurality of magnetic heads arrayed thereon; and correcting actuators for applying operating forces to both end portions and a middle portion of the jig.

10. A magnetic head grinding apparatus according to claim 9, wherein the grinding head and the adjust ring are rotatably supported with respect to a grinding head mounting frame being movable within a plane being parallel with the grinding surface of the grinding disk and are caused to make swing motions within a predetermined angle by swing means disposed on the grinding head mounting frame.

11. A magnetic head grinding apparatus according to claim 10, wherein the jig is mounted onto the back plate at a single point in a middle portion thereof by mounting means.

12. A magnetic head grinding apparatus according to claim 9, wherein the jig is mounted onto the back plate at a single point in a middle portion thereof by mounting means.

13. A magnetic head grinding apparatus according to claim 9, wherein sensors for detecting positions of left and right end portions of the jig are arranged thereon.

14. A magnetic head grinding apparatus according to claim 10, wherein sensors for detecting positions of left and right end portions of the jig are arranged thereon.

* * * * *

UNITED STATES PATENT AND TRADEMARK OFFICE
CERTIFICATE OF CORRECTION

PATENT NO. : 5,993,290

DATED : November 30, 1999

INVENTOR(S): Shinya YOSHIHARA et al.

It is certified that an error appears in the above-identified patent and that said Letters Patent is hereby corrected as shown below:

On the title page, item [75], the 2nd Inventor's name is misspelled. It should be:

--Hiroshi Shindo--

Signed and Sealed this

Second Day of January, 2001

Attest:

Q. TODD DICKINSON

*Attesting Officer*  *Commissioner of Patents and Trademarks*